United States Patent
Klassen et al.

(10) Patent No.: US 7,315,394 B2
(45) Date of Patent: Jan. 1, 2008

(54) CALIBRATION METHOD FOR AN IMAGING DEVICE

(75) Inventors: R. Victor Klassen, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1073 days.

(21) Appl. No.: 10/372,558

(22) Filed: Feb. 25, 2003

(65) Prior Publication Data
US 2004/0165199 A1    Aug. 26, 2004

(51) Int. Cl.
G06F 15/00 (2006.01)
H04N 1/46 (2006.01)
G06K 9/40 (2006.01)

(52) U.S. Cl. .................. 358/1.9; 358/504; 382/275
(58) Field of Classification Search .............. 358/1.9, 358/504, 521, 3.26, 520, 535, 518, 3.23; 382/165, 167, 275
See application file for complete search history.

(56) References Cited

U.S. PATENT DOCUMENTS

| | | | |
|---|---|---|---|
| 5,333,069 A * | 7/1994 | Spence ................. 358/517 |
| 5,347,369 A * | 9/1994 | Harrington ............ 358/401 |
| 5,416,613 A * | 5/1995 | Rolleston et al. ...... 358/518 |
| 5,631,918 A | 5/1997 | Kovacs et al. |
| 5,638,393 A | 6/1997 | Kovacs |
| 5,721,434 A | 2/1998 | Siegel et al. |
| 5,739,927 A * | 4/1998 | Balasubramanian et al. ............ 358/518 |
| 5,809,213 A * | 9/1998 | Bhattacharjya ........ 358/1.6 |
| 6,008,907 A * | 12/1999 | Vigneau et al. ....... 358/1.9 |
| 6,188,466 B1 | 2/2001 | Iwasa et al. |
| 6,404,517 B1 * | 6/2002 | Chao ................... 358/504 |
| 6,441,923 B1 * | 8/2002 | Balasubramanian et al. ............ 358/3.23 |
| RE38,180 E * | 7/2003 | Edge .................... 347/19 |
| 6,654,493 B1 * | 11/2003 | Hilliard et al. ....... 382/167 |
| 6,750,993 B1 * | 6/2004 | Shirai .................. 358/504 |
| 6,755,498 B2 * | 6/2004 | Revie et al. ............ 347/15 |
| 6,775,029 B1 * | 8/2004 | Wen et al. ............ 358/1.9 |
| 6,985,254 B2 * | 1/2006 | Allen et al. ........... 358/1.9 |
| 6,999,199 B2 * | 2/2006 | Degani et al. ........ 358/1.9 |
| 7,064,860 B1 * | 6/2006 | Balasubramanian et al. . 358/1.9 |
| 2002/0085235 A1 * | 7/2002 | Degani et al. ........ 358/3.06 |
| 2004/0136013 A1 * | 7/2004 | Mestha et al. ........ 358/1.9 |
| 2004/0136015 A1 * | 7/2004 | Van de Capelle et al. ... 358/1.9 |

* cited by examiner

Primary Examiner—Madeleine A V Nguyen
(74) Attorney, Agent, or Firm—Maginot, Moore & Beck

(57) ABSTRACT

A method includes forming a plurality of test patches in an array of orthogonal rows. The test patches are formed by using at least one printhead in an imaging machine. Each of the test patches is associated with a respective one of a plurality of initial input color values. The array of test patches includes a plurality of rows of varied-input test patches and at least one row of first equivalent-input test patches. A respective output color value of each of the test patches is measured. At least one first mathematical relationship is generated based on the output color values of the at least one row of first equivalent-input test patches. A plurality of adjusted input color values are calculated for respective ones of the varied-input test patches. Each adjusted input color value is calculated based upon the generated at least one first mathematical relationship. A second mathematical relationship is computed between the adjusted input color values and the output color values. The imaging machine is calibrated by using the second mathematical relationship.

12 Claims, 10 Drawing Sheets

CALIBRATION METHOD FOR AN IMAGING DEVICE

FIELD OF THE INVENTION

The subject invention relates generally to an image printing device, and in particular, an improved method of creating a tone reproduction curve for an image printing device.

BACKGROUND OF THE INVENTION

An imaging device in the form of a printer or copier typically creates images using combinations of four colors of marking agents or colorants, such as cyan, magenta, yellow and black (CMYK). The images are created based on image data which assigns at least one of the four colors and a numerical color intensity or input color value to each picture element or pixel in the image.

A problem is that, due to manufacturing variations, different imaging devices can output different intensities of color based on identical image data. The density of the toner laid down on the print medium determines the color intensity. The denser or thicker the toner is laid down on a white print medium such as paper, the less white is visible through the toner on the paper. Consequently, the denser the toner, the less the lightness of the toner color, and the greater the intensity of the toner color.

Because there is such variation in toner density laid down by different imaging devices based on identical image data, color intensities that are output by some imaging devices can be outside of an acceptable range. Thus, in order to ensure that each imaging device outputs color intensities that closely correspond to the color intensities specified by the image data, each imaging device should be individually calibrated to output appropriate color intensities.

One approach in calibrating an imaging device is to use a tone reproduction curve (TRC), which is a modeled mathematical relationship between the input color values and the colorant amounts that must be sent to the imaging device in order to produce the intensities specified by the input color values. The TRC is a continuous curve on a plot of input color values versus output colorant values that represents a best fit of the discrete data points matching each input color value with an output colorant value that, when rendered on the given device, produces the intensity specified by the input color value.

A processor of the imaging device calculates a separate TRC for each of the colors or separations of the imaging device. The TRCs are used to calibrate the imaging device. More particularly, once such TRCs are established for an imaging device, the TRCs can be used to correlate input color values with imaging device output image colorant values or color intensities. In addition, a multi-dimensional look up table or LUT is often calculated to account for interactions among the colorants and to accommodate different input color spaces, for example, CIELAB or sRGB. Numerous techniques exist in the prior art for deriving LUTs and TRCs for printer calibration and characterization.

A processor of the imaging device calculates a separate TRC for each of the colors or separations of the imaging device. The TRCs are used to calibrate the imaging device. More particularly, once such TRCs are established for an imaging device, the TRCs can be used to correlate input color values with imaging device output image colorant values or color intensities. In addition, a multi-dimensional look up table or LUT is often calculated to account for interactions among the colorants and to accommodate different input color spaces, for example, CIELAB or sRGB. Numerous techniques exist in the prior art for deriving LUTs and TRCs for printer calibration and characterization.

Although the following discussion focuses on TRC construction as an example, much of the discussion also applies to LUT construction. In order to gather the data required to construct the TRCs, optical measuring devices are used to measure the color values of the images output by an imaging device.

In copying or printing systems, such as a xerographic copier, laser printer, or ink-jet printer, a common technique for monitoring the quality of print is to use the color-measuring device to measure an array of artificially created test patches. Each patch is intended to be of a respective predetermined desired density. Generally each patch is about an inch square or less and is printed as a uniform area. The actual density of the printing colorant (toner or ink) in the test patch is then optically measured to determine the effectiveness of the printing process in placing this printing material on the print sheet.

Each of the test patches is formed with a different combination of a colorant (C, M, Y or K) and a numeric input color value. The input color value specifies the desired colorant density, and consequently, the desired output lightness color value or color intensity. The density of the colorant on the test patches varies as a function of the input color value. Thus, optically measuring the density of the patches provides an indication of the input color values with which the patches were made. The denser the colorant on the test patch, the more light will be absorbed by the colorant, and the less light will be reflected back to the optical color-measuring device. This indicates a greater intensity provided by the colorant. The printed test patches are moved past the color-measuring device, and the light absorption of the test patch is measured.

The measurements of the test patches and the input color values used to construct them are used to calculate the TRC. The accuracy of the TRC increases with the number of data points that it is based upon. Measurement error drops by a factor of the square root of the number of measurements. However, from a cost viewpoint, it is desirable to minimize the number of test patches that are printed, since printing test patches consumes a significant amount of colorant.

One source of inaccuracies in TRCs is spatial variation of operation of the imaging device being calibrated. In particular, even a single imaging device does not always deposit a same amount of marking agent for a given input color value at different spatial locations on the page. Rather, the amount of marking agent that is deposited in a group of pixel locations for a given color value can depend upon where on the page the pixel locations are situated. For example, an imaging machine may print an entire horizontal or vertical streak or band of pixel locations with more or less marking agent than is called for by the corresponding input color values. Horizontal or vertical streaking can arise due to variations in raster output scanning spot size across the field, laser diode variations, LED bar power variation, or photoreceptor belt sensitivity variations, among other reasons. Other printing technologies (e.g., thermal inkjet and acoustical ink printing) also have streaking artifacts that fall within the scope of this discussion.

Although the streaks can be one-time occurrences that are not likely to reappear, the streaks can affect calibration operations. In particular, banding or streaking can artificially inflate or deflate the color output values used to plot the TRCs. As a result, subsequent calibration steps will result in inaccurate color reproduction.

FIG. 1 is a plot of input color values that are used to produce single-colorant test patches versus corresponding lightness (L* in CIELAB color space) output color values that are measured from the test patches. It can be assumed that the input color value is a grey scale value ranging from 0 (white) to 255 (black). In the example of FIG. 1, streaking has caused certain outlying data points 10, or outliers, which are measured from test patches that are within the same column of the array of test patches. These outliers 10 are clearly anomalous when compared to the other data points.

A TRC 12 is calculated to fit the data, including the outliers 10. The TRC 12 is a compromise between the outliers 10 and the remaining data, and therefore does not fit the remaining data particularly well. The poor fit is a problem because, while the outliers 10 are transitory, the remaining data is reproducible, and is therefore the best predictor of the future color output characteristics of the imaging machine. Nevertheless, the TRC 12 represents the best known fit of the available data (which includes the outliers), and is subsequently used to calibrate the imaging device. As a result, the actual color output of the imaging device is not as close to the intended color output as is desirable. For example, in the example of FIG. 1, if the imaging device desires to produce an output color value of 45, then it will use an input color value of 90 in accordance with the TRC 12. However, the input color value of 90 will in fact result in an output color value of approximately 37.

One prior art attempt to increase the accuracy of TRCs is to randomize the order of the input color values with which the test patches are printed. In such an approach, test patches in a same row or column are not printed with consecutive input color values (i.e., input color values that are close to each other), as is evident from the outliers 10 being spread out along the TRC 12 in FIG. 1. This prevents particular regions of the TRC from being unduly warped from the effects of the vertical or horizontal streaking. However, this does not eliminate the underlying problem caused by streaking, namely that the outlying output color values will cause inaccuracy of the TRC.

Another approach to reducing the inaccuracies due to outlying data consists of identifying and discarding the outlying data before constructing the TRC. However, in order to conserve marking agent, the input color values are sampled very sparsely over the range of input color values to be represented by the sampled input color values. That is, the sampled input color values are widely spread out and each sampled input color value is very different from its adjacent sampled input color values. This is particularly true when dealing with test patches formed of multiple color components, which causes the sampled input color values to be separated in multi-dimensional space. Thus, throwing out measured color values would leave unacceptable gaps in the data with which the TRC is formed. Moreover, the outlying data, although anomalous, still contains useful information.

What is needed in the art is a new and improved technique for process control, in particular, for establishing a tone reproduction curve or multidimensional LUT. In particular, what is needed is a technique for establishing a tone reproduction curve that is not affected by streaks in the printer output when test patches are printed. Other advantages of the present invention will become apparent from the following description, and the features characterizing the invention will be pointed out with particularity in the claims annexed to and forming a part of this specification.

SUMMARY OF THE INVENTION

The above needs, as well as others, are fulfilled by providing a method and arrangement for creating a tone reproduction curve that reduces the adverse effects of streaks in the array of test patches from which the tone reproduction curve is derived.

In embodiments of the invention, a method includes forming a plurality of test patches in an array of orthogonal rows. The test patches are formed by using an imaging machine. Each of the test patches is associated with a respective one of a plurality of initial input colorant values. The array of test patches includes a plurality of rows of varied-input test patches and at least one row of first equivalent-input test patches. A respective output color value of each of the test patches is measured. At least one first mathematical relationship is generated based on the output color values of the at least one row of first equivalent-input test patches. A plurality of adjusted input colorant values are calculated for respective ones of the varied-input test patches. Each adjusted input colorant value is calculated based upon the generated at least one first mathematical relationship. A second mathematical relationship is computed between the adjusted input colorant values and the output color values. The imaging machine is calibrated by using the second mathematical relationship.

In other embodiments of the invention, a method includes creating an array of test patches by depositing a marking agent using an imaging machine. Each of the test patches is associated with a respective one of a plurality of initial input colorant values. A respective output color value of each of the test patches is measured. A first mathematical relationship is calculated between the initial input colorant values and the output color values. A plurality of adjusted input colorant values are determined based on the first mathematical relationship. A second mathematical relationship is generated between the adjusted input colorant values and the output color values.

In other embodiments of the invention, an arrangement includes an array of test patches. Each of the test patches is formed of a marking agent. Each of the test patches is associated with a respective one of a plurality of initial input colorant values. A sensor measures an output color value of each test patch. A processor calculates a first mathematical relationship between the initial input colorant values and the output color values of the test patches. The processor also determines a plurality of adjusted input colorant values based on the first mathematical relationship. The processor further generates a second mathematical relationship between the adjusted input colorant values and the output color values.

The use of adjusted input colorant values helps reduce the impact of streaks in the array of color patches because the adjustment effectively removes the influence of the streaks. As a result, the presence of streaks in an array of test patches has limited effect on the tone reproduction curve. Thus, the imaging device can be calibrated with a tone reproduction curve that is the best predictor of the output color characteristics of the imaging machine.

The above discussed features and advantages, as well as others, may be readily ascertained by those of ordinary skill in the art by reference to the following detailed description and accompanying drawings.

DETAILED DESCRIPTION

Figure 1:
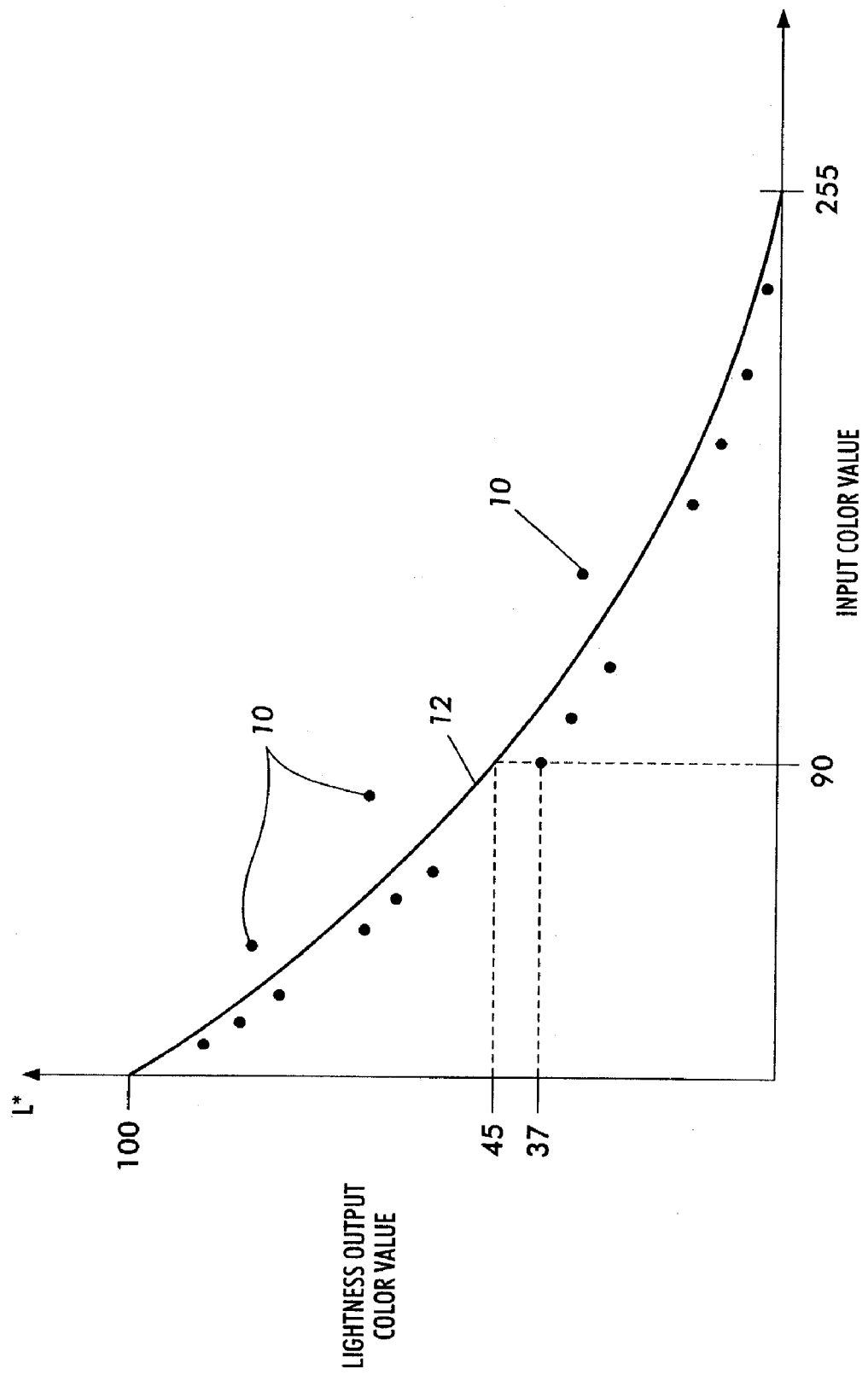
FIG. 1 shows a plot of a tone reproduction curve fitted to color output values measured from test patches according to a known method.
Figure 2:
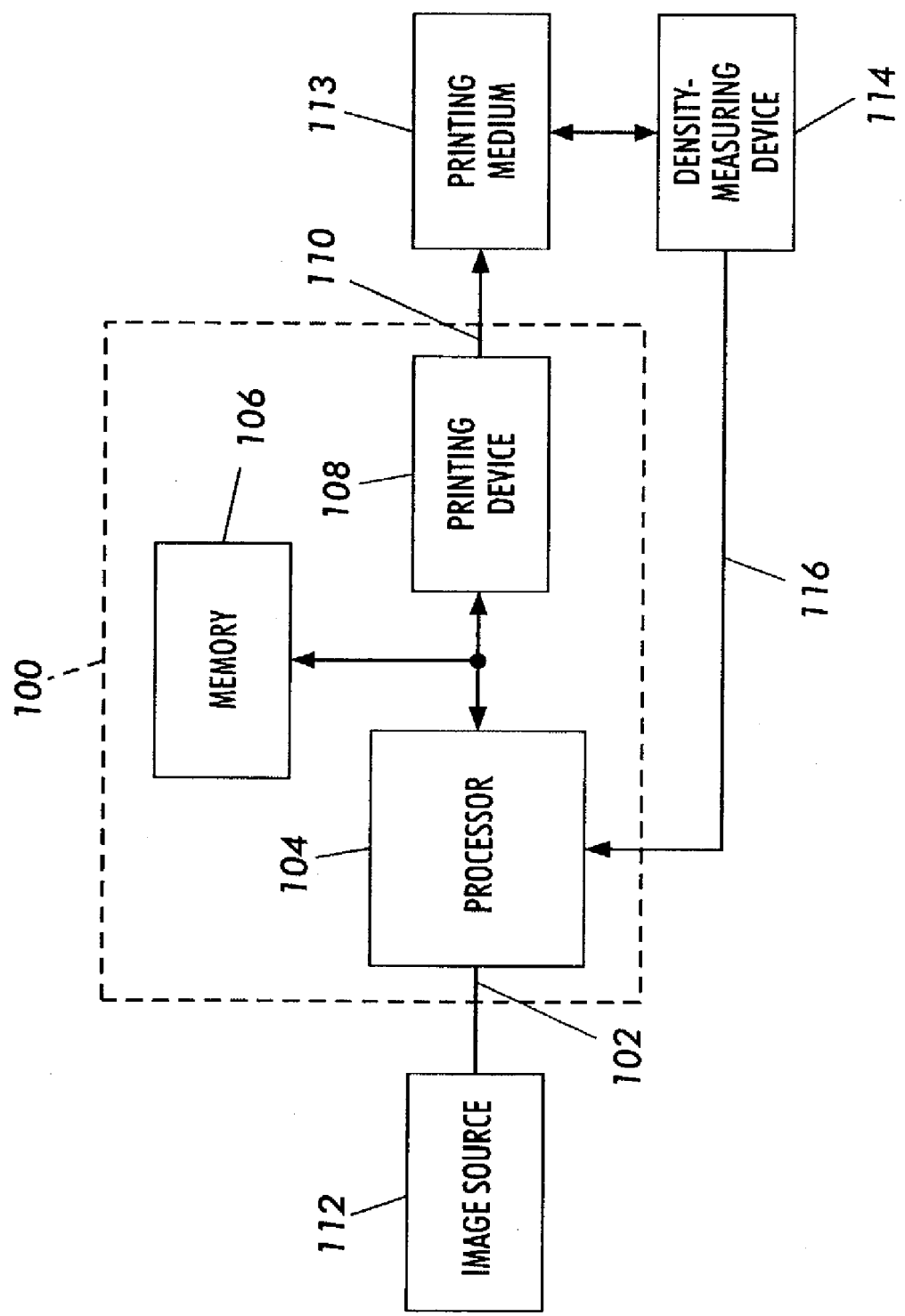
FIG. 2 shows a block diagram of an exemplary printing system that includes an arrangement according to embodiments of the subject invention.

FIG. 2 shows a system that prints test patches, measures color output values of the test patches, and calibrates the color output characteristics of the system based upon the measured color output values. The system includes an arrangement 100 according to embodiments of the present subject invention, an image source 112, a print medium 113, and a color-measuring device 114.

The arrangement 100 includes an input 102, a processor 104, a memory 106, a printing device 108, and an output 110. In general, the arrangement receives at the input 102 an image and generates at the output 110 printed pages of recording media from which the image may be physically reconstructed.

The image source 112 can be any suitable device that generates image data corresponding to a two-dimensional image. The image source 112 is further configured to provide image data corresponding to an array of rows and columns of test patches that are used to calibrate the arrangement 100, as will be discussed in more detail below. To this end, the image source 112 can be a general purpose computer that generates printable output data, such as that generated using charting software, presentation software, computer-aided design software, and the like. In other words, the data can be generated as a software output file. Alternatively, the image source 112 can be in the form of a processor that can be found, for example, in a color copier. Such a processor can be either separate from or integral with the processor 104. It will be appreciated that the image source 112 can in some cases be a software routine that is performed by the processor 104. For example, the software routine can output a sequence of colors and input color values with which test patches are to be produced by the printing device 108. However, typically, the image source 112 will be a separate device that may or may not include other processors. The image source can possibly provide the image data in any color space, including CMYK, RGB, CIELAB, etc.

Referring now to the arrangement 100 according to embodiments of the present invention, the processor 104 is a controller, microprocessor, microcontroller, programmable digital logic circuit, or other processing device, that is operable to, among other things, generate color input values in CMYK color space that correspond to the image data received from the image source 112. In most cases, the CMYK color input values will be generated by the processor 104 with the intent of causing the printing device 108 to produce an output 110 that is an accurate visual manifestation of the image data that is contained in the input 102.

The printing device 108 is a device that is operable to print the image information from the processor 104 and/or the memory 106 onto a recording medium or print medium. To this end, the printing device 108 may be an ink jet printer, a laser printer, a xerographic printing device, or other printing device that is operable to print to a recording medium based on pixel data in scan line or raster format. The printing device 108 typically uses marking agents, such as ink or toner, which can be available in four colors, such as cyan, magenta, yellow and black.

In order that the printing device 108 can achieve the many shades of color in the input color values with only the four colors of marking agents at its disposal, the processor 104 may transform the input color values into halftoned pixel data, as is well known in the art. Accordingly, the processor 104 in this embodiment is operable to translate the CMYK input color values calculated by the processor into halftone pixel data that can be stored in the memory 106. The processor 104 is also operable to coordinate the transfer of the halftone pixel data from the memory 106 to the printing device 108. To this end, it will be appreciated that the processor 104 as depicted herein can include one device or several devices that perform the various processing steps described above.

The color-measuring device 114 receives the output of the printing device 108 that is printed on a print medium 113, such as paper. In accordance with one embodiment of the subject invention, the device is a color-measuring device 114 in the form of a light sensor that measures the color output values of an array of rows and columns of test patches that are printed on one or more sheets of paper by the printing device 108. The color-measuring device 114 generally emits light onto each of the test patches and measures an amount of light that is reflected off of the patch and back to the color-measuring device. The darker the test patch, the less light that is reflected back to the color-measuring device 114. The color-measuring device 114 transmits a signal 116 to the processor 104. The signal 116 indicates the output color values measured for each of the test patches. The color-measuring device 114 can include a light-emitting diode (LED) to emit light onto the patches, and a photosensitive diode to sense the amount of light being reflected off of the patches. If in the form of a scanner, the color-measuring device 114 can contain document illumination lamps, optics, a mechanical scanning drive, and a charge coupled device (CCD array) or full width color scanning array.

Although the color-measuring device can be attached to the arrangement 100, it is more typical for the color-measuring device 114 to be separate from the arrangement 100. More particularly, the color-measuring device 114 can be provided in the factory where the imaging device 100 is manufactured. In this case, the color-measuring device 114 can be used to calibrate the output of the imaging device 100 before the imaging device 100 leaves the factory. Alternatively, or additionally, the color-measuring device 114 can be provided at the facility where the imaging device 100 operates in order to occasionally calibrate the output of the imaging device 100 over the course of its useful life.

Figure 3:
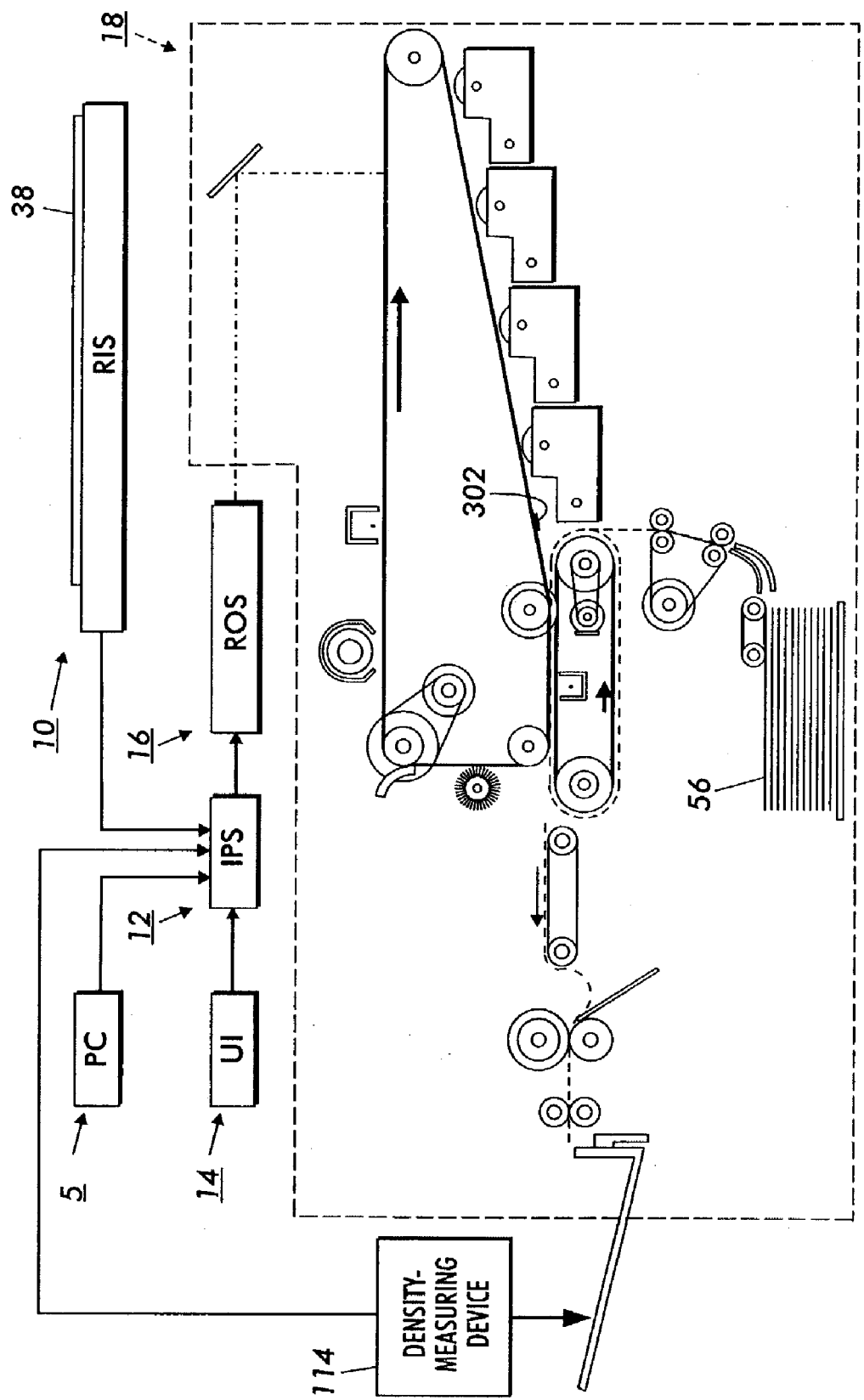
FIG. 3 shows in further detail a functional block diagram of a first embodiment of the arrangement and image source of FIG. 1 according to embodiments of the subject invention.

FIG. 3 shows an exemplary embodiment of a printing machine that incorporates aspects of the invention. FIG. 3 is a schematic elevational view showing an exemplary electrophotographic printing machine and a networked PC which may incorporate features of the present invention therein. As discussed above, however, it will become evident from the following discussion that embodiments of the subject invention are equally well suited for use in a wide variety of printing and copying systems, and therefore are not limited in application to the particular system(s) shown and described herein.

The exemplary electrophotographic printing machine of FIG. 3 is operable to print on recording media images that are generated when an input manuscript is scanned. To begin by way of general explanation of the machine of FIG. 3, an image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with the IPS 12. A user interface (UI), indicated generally by the reference numeral 14, is also in communication with the IPS 12.

The UI 14 enables an operator to control and monitor various operator-adjustable functions and maintenance activities. The operator actuates the appropriate keys of the UI 14 to adjust the parameters of the copy. The UI 14 may be a touch screen, or any other suitable control panel, providing an operator interface with the system. The output signal from the UI 14 is transmitted to the IPS 12. The UI 14 may also display electronic documents on a display screen (not shown in FIG. 3).

As further shown in FIG. 3, a multiple color original document 38 may be positioned on a raster input scanner (RIS), indicated generally by the reference numeral 10. The RIS 10 contains document illumination lamps, optics, a mechanical scanning drive, and a charge coupled device (CCD array) or full width color scanning array. The RIS 10 captures the entire image from the original document 38 and converts it to a series of raster scan lines and moreover measures a set of primary color densities, i.e., red, green and blue densities, at each point of the original document. The RIS 10 may provide data on the scanned image to the IPS 12, indirectly to the PC 5 and/or directly to the PC 5.

Digitized electronic documents may be created, modified, stored and/or otherwise processed by the PC 5 prior to transmission/relay to the IPS 12 for printing on a printer or marking engine, indicated generally by the reference numeral 18. The display of the PC 5 may show electronic documents on a screen (not shown in FIG. 3). In the embodiment described herein, the IPS 12 includes the processor(s), controller(s), and/or other circuits (not shown in FIG. 3) required to perform the operations ascribed to the processor 104 of FIG. 2. Nevertheless, in an alternative embodiment, the operations of the processor 104 of FIG. 2 may be carried out within the PC 5.

The IPS 12 also transmits signals corresponding to the desired electronic or scanned image to the marking element, which creates the output copy image, using methods not material to this invention. The marking element causes more or less of the various colorants (ink or toner) to be deposited and/or affixed to the paper according to the strengths of the signals it receives.

Typically, in color printing, there are four signals, one for each of yellow, magenta, cyan and black. Each of the signals controls how much of a corresponding colorant is deposited on the paper. The amount of the corresponding colorant controls how much light is reflected and how much is absorbed in part of the spectrum. For example, the amount of yellow colorant controls how much blue light is reflected, because yellow colorant has a yellow appearance due to absorbing blue and reflecting other colors. To produce a green appearance, yellow and cyan colorants are used in combination to absorb both blue and red, leaving only light in the green portion of the spectrum.

The printer 18 produces an array of test patches 302 on a sheet 56. The test patches 302 on the sheet 56 can include (unintentional) streaks. The color-measuring device 114 measures the density of the test patches 302, including any patches 302 that are affected by streaking. The color-measuring device 114 transmits the measurement data to the IPS 12. The IPS 12 then uses the measurement data to calculate a TRC that takes into account the effects of any streaking that may have occurred. Thus, the IPS 12 calibrates the printer 18. The IPS 12 calculates the TRC using the method described below in connection with FIG. 4.

Specifically, an overview of one embodiment of a method in accordance with the subject invention will now be described with reference to FIG. 4. FIG. 5 shows an array of test patches 302 printed by the imaging device 100 during the execution of the method of FIG. 4. Reference to FIG. 5 will be made during the discussion of FIG. 4.

In step 202, the imaging device 100 prints an array of orthogonal rows of toner test patches 302 on a print medium in the form of a sheet of paper 304. The orthogonal rows of the array include a plurality of vertical rows (or columns) 306 and a plurality of horizontal rows 308. Each of the test patches 302 is created with a different input color value, or set of input color values, in CMYK color space. The array of test patches 302 represents a sampling of the range of input color values 0 to 255 for each of cyan, magenta, yellow and black. Some of the test patches can be formed of combinations of at least two of cyan, magenta and yellow. Such multi-color test patches are created with a set of input color values, i.e., one input color value for each color component.

The input color values can originate in either the processor 104 or the image source 112. In either case, the input color values used to form the test patches 302 can be stored in the memory 106 for further processing.

After the marking engine 18 prints the test patches 302 on the paper 304 in step 202, step 204 is executed. In step 204, a user inserts the paper into a color-measuring device 114 which measures the reflectivity of each of the patches 302 individually. More particularly, the color-measuring device 114 emits light onto each one of the test patches 302 and measures an amount of the light that is reflected off of the test patch and back to the color-measuring device 114. From the amount of reflected light, the device 114 determines or measures an output color value of the patch 302 (step 204). More specifically, the device 114 measures the luminance or lightness color value known as L* in CIELAB color space, ranging from 0 (darkest) to 100 (lightest), as well as a* and b* values relating to relative redness or greenness and relative blueness or yellowness, respectively. Related to the luminance of the patch 302 is the density of the marking agent that forms the patch 302. The marking agent density of the patch 302 generally decreases with increasing luminance L* of the patch 302.

After the output color values of the test patches have been measured in step 204, step 206 is executed. In step 206, the processor 104 adjusts the input color values to compensate for the effects of streaking. More particularly, the processor 104 identifies any horizontal row or vertical row of test patches whose output color values are anomalously high or low in view of the input color values with which the test patches were made, and in view of the input color values and output color values of test patches from other rows. The processor 104 then calculates adjusted input color values for each of the anomalous test patches. The adjusted input color values represent the input color values that would result in the anomalous output color values in the absence of streaking.

After the input color values are adjusted in step 206, step 208 is executed. In step 208, the processor 104 calculates an improved mathematical relationship, or tone reproduction curve, using the adjusted input color values and the measured output color values. The reproduction curve is improved in the sense that it is less affected by the presence of the vertical streaking phenomenon. That is, the second tone reproduction curve is compensated for the effects of the vertical streaking.

After the improved tone reproduction curve has been generated in step 208, step 210 is executed. In step 210, the improved version of the tone reproduction curve is used to calibrate the imaging arrangement. More particularly, the tone reproduction curve can be inverted if necessary to be in the form of the input colorant value expressed as a function of the output color value. Thus, if the image source 112 provides print data that is expressed in CIELAB color space, or is in a form that the processor 104 can translate into CIELAB color space, then the processor 104 can use the second tone reproduction curve to calculate input color values that can be halftoned and sent to the printing device 108 in order to achieve the desired output color value on the print medium.

Steps 202-210 can be repeated for each color of marking agent, such as cyan, magenta, yellow and black. Thus, a separate improved tone reproduction curve can be separately calculated for each of the four colors. Moreover, steps 202-210 can be repeated using test patches that are printed in combinations of at least two of the four colors. Thus, three-dimensional, four-dimensional, and five-dimensional tone reproduction curves can also be calculated to characterize the lightness color output values producible by combinations of two, three and four of the colors, respectively.

A detailed exemplary numerical example will now be presented in order to describe one embodiment of the method of the subject invention. Table I is a representation of an array of orthogonal rows of test patches that is printed on a print medium according to step 202. Each test patch in Table I is represented by a respective initial input colorant value used to produce the test patch, wherein an input colorant value of 0 produces the lightest output, and an input colorant value of 255 produces the darkest output. Each patch in Table I is formed of a single color component, such as cyan, magenta, yellow or black. The orthogonal array includes vertical columns A-I extending down the print medium, and horizontal rows 1-13 extending across the print medium.

TABLE I

|    | A   | B   | C   | D   | E   | F   | G   | H   | I   |
|----|-----|-----|-----|-----|-----|-----|-----|-----|-----|
| 1  | 170 | 170 | 170 | 170 | 170 | 170 | 170 | 170 | 170 |
| 2  | 170 | 85  | 85  | 85  | 85  | 85  | 85  | 85  | 170 |
| 3  | 170 | 85  | 10  | 131 | 252 | 117 | 238 | 85  | 170 |
| 4  | 170 | 85  | 61  | 182 | 47  | 168 | 33  | 85  | 170 |
| 5  | 170 | 85  | 112 | 233 | 98  | 219 | 84  | 85  | 170 |
| 6  | 170 | 85  | 163 | 28  | 149 | 14  | 135 | 85  | 170 |
| 7  | 170 | 85  | 214 | 79  | 200 | 65  | 186 | 85  | 170 |
| 8  | 170 | 85  | 9   | 130 | 251 | 116 | 237 | 85  | 170 |
| 9  | 170 | 85  | 60  | 181 | 46  | 167 | 32  | 85  | 170 |
| 10 | 170 | 85  | 111 | 232 | 97  | 218 | 83  | 85  | 170 |
| 11 | 170 | 85  | 162 | 27  | 148 | 13  | 134 | 85  | 170 |
| 12 | 170 | 85  | 85  | 85  | 85  | 85  | 85  | 85  | 170 |
| 13 | 170 | 170 | 170 | 170 | 170 | 170 | 170 | 170 | 170 |

The test patches in horizontal rows 1 and 13 and in vertical columns A and I, on opposite ends of the array, are a group of first equivalent-input test patches, in that they are each produced by using an input colorant value of 170 (two-thirds coverage). A group of second equivalent-input test patches, each produced with an input color value of 85 (one-third coverage), are disposed in rows 2 and 12, and in columns B and H, on opposite ends of the array.

The remainder of the test patches, surrounded by the first and second equivalent-input test patches, are varied-input test patches in that they are produced using input color values varying in a range between 0 and 255. As can be seen in Table I, the varied-input test patches are positioned randomly relative to their respective input color values. Thus, print artifacts related to a certain range of input color values are not likely to be mistakenly assumed to be related to certain horizontal rows or vertical columns of the test patches.

After the test patches have been printed according to step 202, step 204 is executed. The color-measuring device 114 processes the page of test patches and measures the output color value L* of each of the test patches according to step 204. Table II is a representation of the L* values measured for each of the respective test patches. The measurements include a noise component, which can be modeled as white noise, that causes some inevitable differences in the L* measurements of equivalent-input test patches. However, as can be seen in rows 1-2 and 12-13, the L* values in column E are anomalously higher than their equivalent-input counterparts in the other columns. For example, the L* values in row 1 are all either 23.1 or 23.2 with the exception of column E, where the L* value is 29.5. Similarly, anomalously higher L* values can also be observed in rows 2, 12 and 13 of column E. The anomalous L* values being confined to column E is indicative of the presence of streaking in the test patches of column E.

TABLE II

|    | A    | B    | C    | D    | E    | F    | G    | H    | I    |
|----|------|------|------|------|------|------|------|------|------|
| 1  | 23.2 | 23.1 | 23.2 | 23.2 | 29.5 | 23.1 | 23.1 | 23.1 | 23.1 |
| 2  | 23.2 | 58.2 | 58.3 | 58.3 | 62.2 | 58.3 | 58.2 | 58.3 | 23.1 |
| 3  | 23.2 | 58.3 | 94.8 | 38.2 | 5.3  | 44.1 | 2.8  | 58.3 | 23.2 |
| 4  | 23.2 | 58.3 | 69.5 | 18.9 | 78.5 | 23.9 | 83.1 | 58.2 | 23.2 |
| 5  | 23.1 | 58.3 | 46.3 | 3.8  | 56.8 | 7.4  | 58.7 | 58.3 | 23.1 |
| 6  | 23.2 | 58.3 | 25.7 | 85.6 | 37.0 | 92.8 | 36.7 | 58.3 | 23.1 |
| 7  | 23.2 | 58.3 | 8.8  | 61.0 | 19.6 | 67.6 | 17.5 | 58.2 | 23.1 |
| 8  | 23.1 | 58.2 | 95.3 | 38.7 | 5.6  | 44.5 | 3.0  | 58.3 | 23.1 |
| 9  | 23.1 | 58.3 | 69.9 | 19.2 | 79.0 | 24.2 | 83.7 | 58.2 | 23.1 |
| 10 | 23.1 | 58.3 | 46.7 | 4.0  | 57.2 | 7.7  | 59.2 | 58.3 | 23.1 |
| 11 | 23.1 | 58.3 | 26.1 | 86.2 | 37.4 | 93.3 | 37.0 | 58.3 | 23.2 |

TABLE II-continued

|   | A | B | C | D | E | F | G | H | I |
|---|---|---|---|---|---|---|---|---|---|
| 12 | 23.2 | 58.3 | 58.3 | 58.3 | 62.2 | 58.2 | 58.2 | 58.3 | 23.2 |
| 13 | 23.1 | 23.1 | 23.1 | 23.1 | 29.5 | 23.2 | 23.1 | 23.2 | 23.1 |

After step 204, steps 206 and 208 are executed. The step 206 of adjusting the input color values to compensate for streaking and the step 208 of generating an improved tone reproduction curve that compensates for outlying data in accordance with embodiment of the subject invention will now be described in greater detail with reference to FIG. 6.

Figure 6:
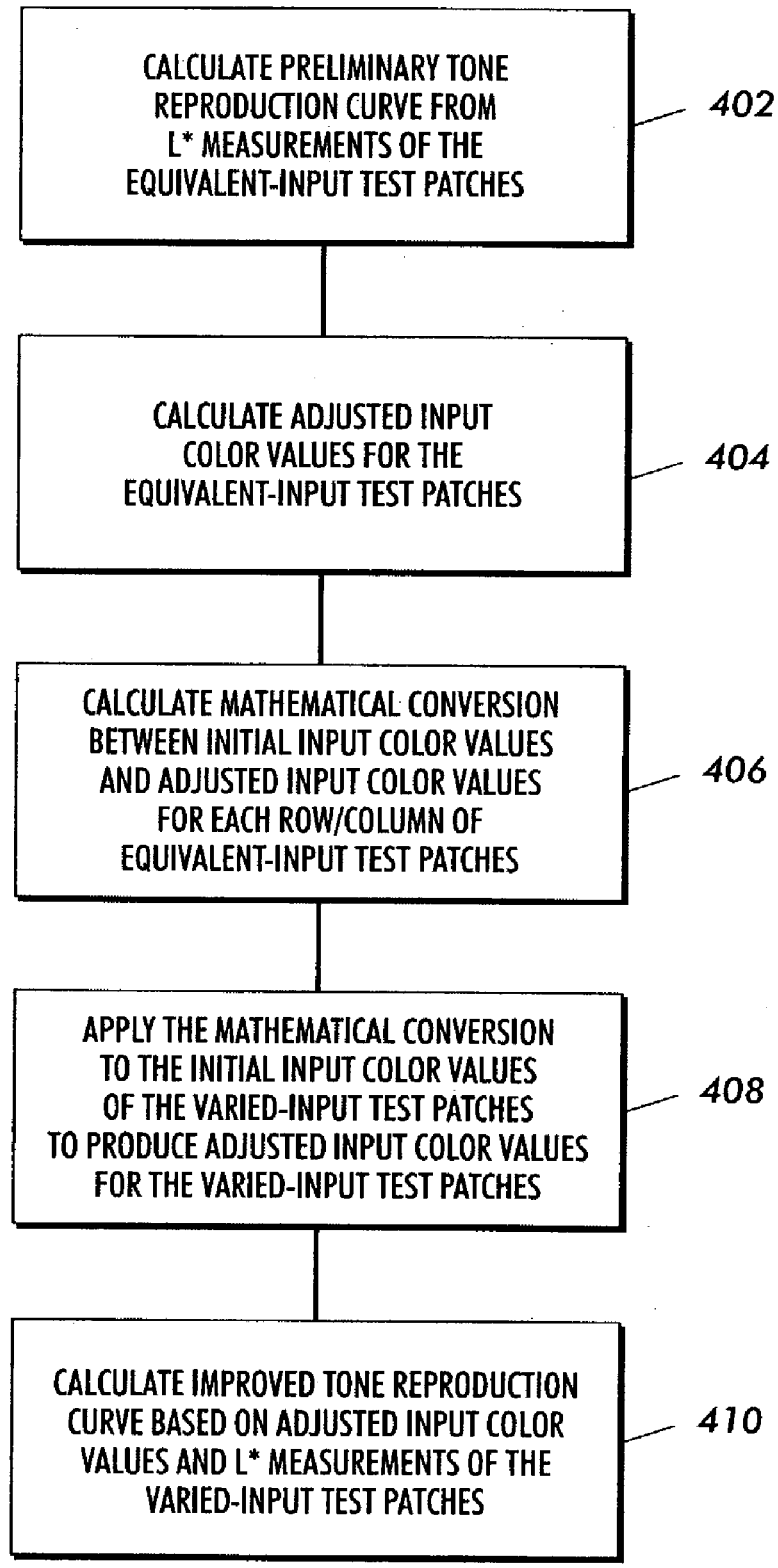
FIG. 6 shows a flow chart of exemplary details of the step in FIG. 4 of generating an improved tone reproduction curve.

Referring now to FIG. 6, in a first step 402, a preliminary tone reproduction curve is calculated from the L* measurements of the first and second equivalent-input test patches. An average or mean measured L* value is separately calculated for the first equivalent-input test patches (input color value of 170) and the second equivalent-input test patches (input color value of 85). The anomalous data, or outliers among the measured L* values are excluded from the calculations of the means. For example, a predetermined percentage, such as 10%, of the data can be excluded on the basis of having an L* value farthest from the mean. That is, after a preliminary mean for the L* values of the first equivalent-input test patches is measured, a final mean for the L* values can be calculated by excluding the 10% of the L* values that are farthest away from the preliminary mean. Alternatively, the highest 5% and lowest 5% could be discarded.

By way of example, using the data of Tables I and II, an average L* value for the first equivalent-input patches can be calculated as 23.14. Similarly, an average L* value for the second equivalent-input patches can be calculated as 58.27. Further, input color values of 0 and 255 can be assumed to yield L* output color values of 100 and 0, respectively. These four data points, which are compiled in Table III, are used to calculate the preliminary tone reproduction curve shown in FIG. 7. More particularly, the processor 104 can calculate a fourth order polynomial that represents a best fit of the four data points, and this polynomial can be used as the preliminary tone reproduction curve.

The best fit polynomial can be conventionally calculated so as to minimize the sum of the squares of the deviations between the data points and the polynomial, as is well known in the art. More specifically, each deviation can be measured between the y value of the data point and the y value of the polynomial at the x value of the data point. However, it is also possible to calculate the polynomial by other techniques. The polynomials referred to herein and their coefficients are for illustrative purposes only, and are not intended to be considered the only functions that can be derived within the scope of the subject invention from the data that is presented.

TABLE III

| Known Initial Input Color Value | Average Measured L* | Assumed L* |
|---|---|---|
| 0 | N/A | 100 |
| 85 | 58.27 | N/A |
| 170 | 23.14 | N/A |
| 255 | N/A | 0 |

Figure 7:
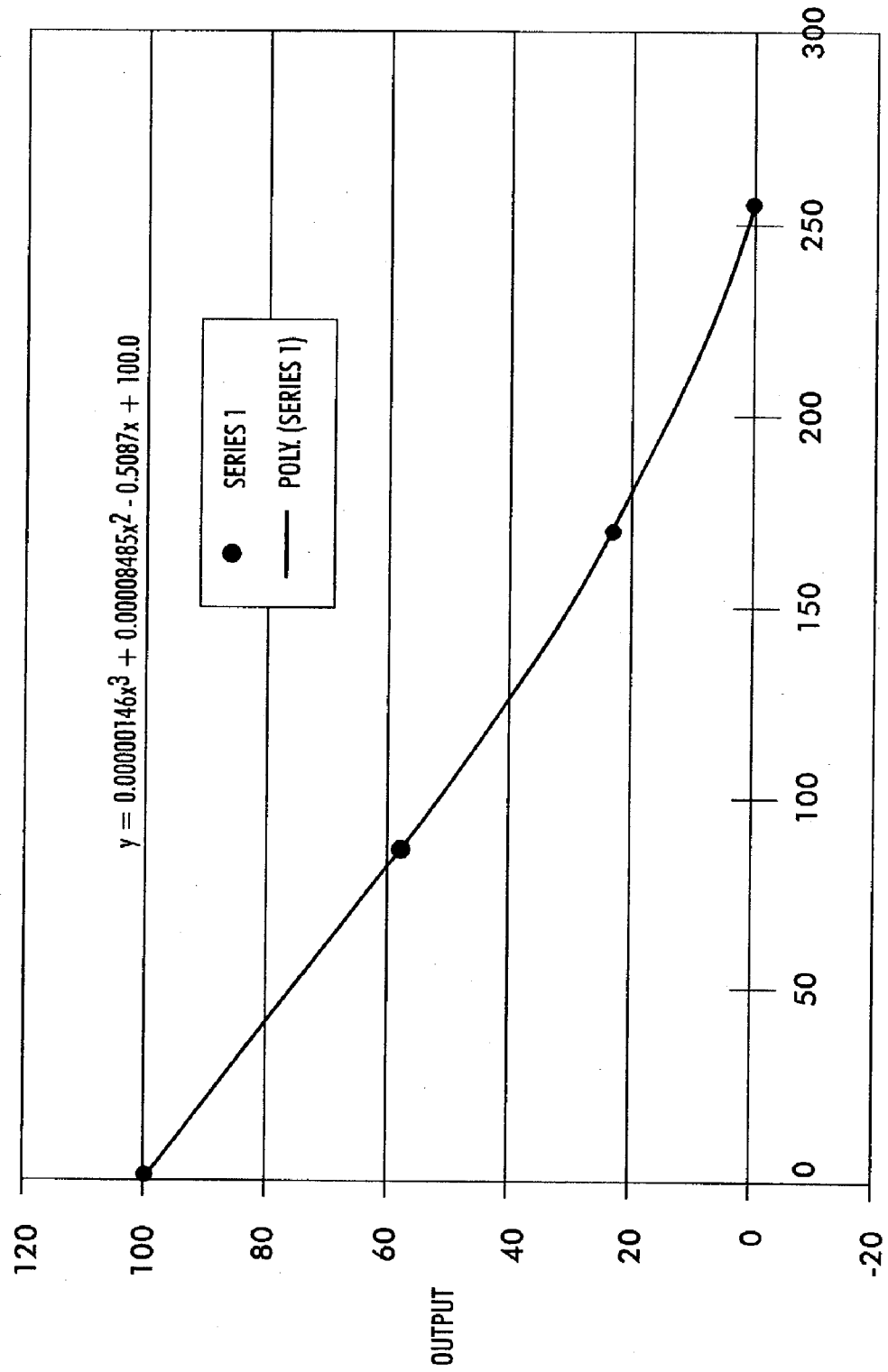
FIG. 7 shows a plot of an exemplary preliminary tone reproduction curve created in one embodiment of the method of the subject invention.

As shown in FIG. 7, the processor 104 calculates the polynomial for the above exemplary values as:

$$y = 0.00000146x^3 + 0.00008374x^2 - 0.508627x + 100.0$$

wherein y is the lightness output color value, and x is the initial input color value. Thus, the step 402 of calculating the preliminary tone reproduction curve is complete.

Figure 8:
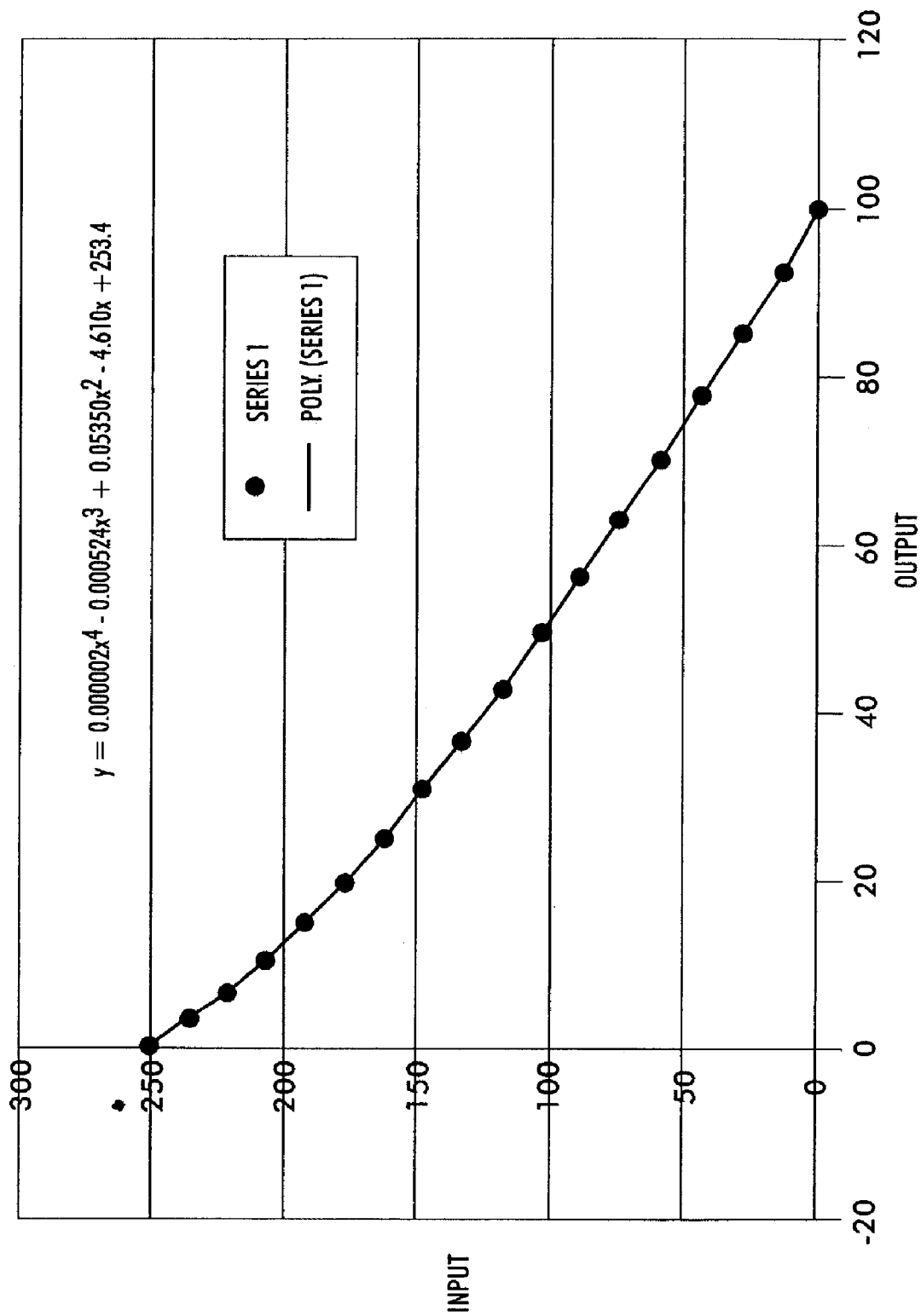
FIG. 8 shows a plot of an inverted version of the exemplary preliminary tone reproduction curve of FIG. 7.

After step 402, in step 404, the processor 104 calculates adjusted input color values for the equivalent-input test patches. The processor 104 first inverts the polynomial to create a different version of the preliminary tone reproduction curve in which the initial input color value is expressed as a function of the lightness output color value. As shown in FIG. 8, the processor 104 calculated the inverted polynomial as:

$$y = 0.000002x^4 - 0.000524x^3 + 0.05350x^2 - 4.610x = 253.4$$

wherein x is the lightness output color value, and y is the initial input color value.

The processor 104 then calculates adjusted input color values for each of the first and a second equivalent-input test patches in rows 1, 2, 12 and 13. More particularly, the processor 104 inserts the measure L* values from Table II for each of the first and second equivalent-input test patches in rows 1, 2, 12 and 13 as the x variable in the inverted polynomial above to thereby yield corresponding adjusted input color values, which are shown in Table IV. Ideally the values in row 1 would be 170, except in those columns where streaks occur (i.e. column E), however the process of data fitting to slightly noisy data results in small deviations. These adjusted input color values can be thought of as the effective input color values that yield the measured L* values of Table II. That is, adjusted input color values vary with the actual density of the marking agent in the corresponding test patch.

TABLE IV

|   | A | B | C | D | E | F | G | H | I |
|---|---|---|---|---|---|---|---|---|---|
| 1 | 169.4 | 169.5 | 169.4 | 169.4 | 152.1 | 169.4 | 169.4 | 169.5 | 169.5 |
| 2 | 169.4 | 85.9 | 85.8 | 85.8 | 77.5 | 85.9 | 85.9 | 85.8 | 169.5 |
| 12 | 169.4 | 85.8 | 85.8 | 85.8 | 77.5 | 85.9 | 85.9 | 85.8 | 169.4 |
| 13 | 169.4 | 169.5 | 169.5 | 169.5 | 152.0 | 169.4 | 169.5 | 169.4 | 169.4 |

Thus, the step 404 of calculating adjusted input color values for the equivalent-input test patches is complete.

After step 404, in step 406, the processor 104 separately calculates a mathematical relationship or conversion between the initial input color values of Table I and the adjusted input color values of Table IV for each column of the first and second equivalent-input test patches in rows 1, 2, 12 and 13. More particularly, in Table V, the processor 104 calculates a simple ratio between each initial input color value in rows 1, 2, 12 and 13 of Table I and the corresponding adjusted input color value from Table IV. The processor 104 calculates an average of the ratios in each column as the last row of Table V. These average are the mathematical conversions between each column of the initial input color values of Table I and the adjusted input color values of Table IV.

TABLE V

|   | A | B | C | D | E | F | G | H | I |
|---|---|---|---|---|---|---|---|---|---|
| 1 | 1.00 | 1.00 | 1.00 | 1.00 | 1.12 | 1.00 | 1.00 | 1.00 | 1.00 |
| 2 | 1.00 | 0.99 | 0.99 | 0.99 | 1.10 | 0.99 | 0.99 | 0.99 | 1.00 |
| 12 | 1.00 | 0.99 | 0.99 | 0.99 | 1.10 | 0.99 | 0.99 | 0.99 | 1.00 |
| 13 | 1.00 | 1.00 | 1.00 | 1.00 | 1.12 | 1.00 | 1.00 | 1.00 | 1.00 |
| Average | 1.00 | 1.00 | 1.00 | 1.00 | 1.11 | 1.00 | 1.00 | 1.00 | 1.00 |

Thus, step 406 of calculating mathematical conversions between the initial input color values and the adjusted input color values for each row of equivalent-input test patches is complete.

After step 406, in step 408, the processor 104 applies the mathematical conversions generated in step 406 to the initial input color values of the varied-input test patches to produce adjusted input color values for the varied-input test patches. More particularly, the processor 104 divides each of the initial input color values from Table I of the varied-input color patches by the column averages in the last row of Table V to yield adjusted input color values for the varied-input test patches, as shown in Table VI. As with the adjusted input color values for the equivalent-input test patches, these adjusted input color values for the varied-input test patches can be thought of as the effective input color values that yield the measured L* values of Table II.

TABLE VI

|    | C     | D     | E     | F     | G     |
|----|-------|-------|-------|-------|-------|
| 3  | 10.0  | 131.4 | 227.6 | 117.4 | 238.8 |
| 4  | 61.2  | 182.6 | 42.4  | 168.6 | 33.1  |
| 5  | 112.3 | 233.8 | 88.5  | 219.7 | 84.3  |
| 6  | 163.5 | 28.1  | 134.6 | 14.0  | 135.5 |
| 7  | 214.6 | 79.3  | 180.6 | 65.2  | 186.7 |
| 8  | 9.0   | 130.4 | 226.7 | 116.4 | 237.8 |
| 9  | 60.2  | 181.6 | 41.5  | 167.6 | 32.1  |
| 10 | 111.3 | 232.8 | 87.6  | 218.7 | 83.3  |
| 11 | 162.5 | 27.1  | 133.7 | 13.0  | 134.5 |

Thus the step 408 of applying the mathematical conversions to the initial input color value of the varied-input test patches to produce adjusted input color values for the varied-input test patches is complete. Further, the larger step 206 of adjusting the input color values to compensate for streaking is also complete.

After step 408, in step 410, the processor 104 calculates a mathematical relationship in the form of an improved tone reproduction curve based on the adjusted input color values of the varied-input test patches in Table VI and the corresponding L* measurements from Table II. More particularly, the processor 104 calculates a polynomial (plotted in FIG. 9) that represents a best fit of the forty-five data points formed by the or values of the varied-input test patches in Table VI and their corresponding L* measurements from Table II.

Figure 9:
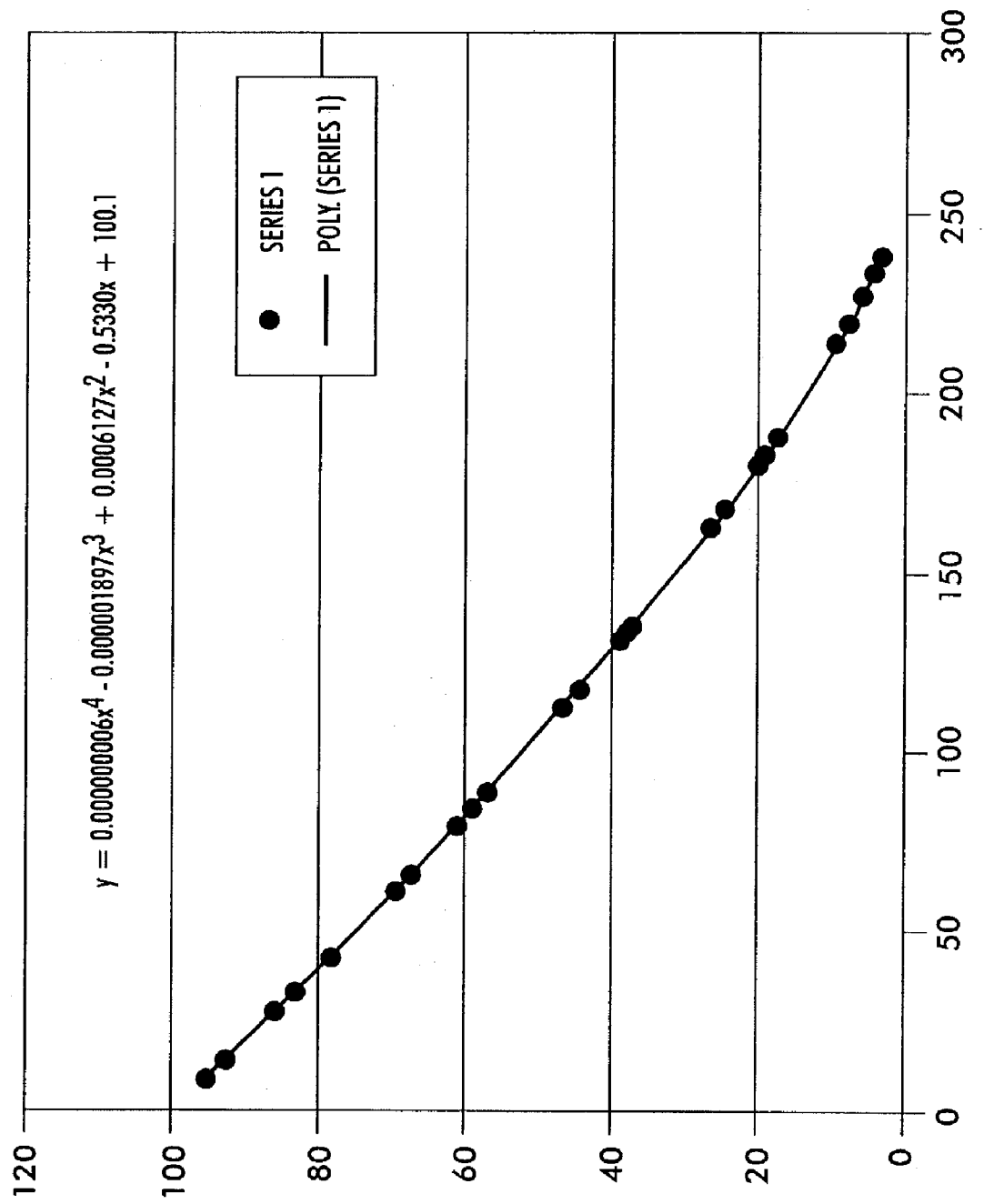
FIG. 9 shows a plot of an exemplary final tone reproduction curve created in one embodiment of the method of the subject invention.

As shown in FIG. 9, the processor 104 calculates the polynomial tone reproduction curve as:

$$y = 0.000000006x^4 - 0.000001897x^3 + 0.0006127x^2 - 0.5330x + 100.1$$

wherein y is the lightness output color value, and x is the initial input color value.

Thus, the step 410 of calculating an improved tone reproduction curve based on adjusted input color values and L* measurements of the varied-input test patches is complete.

Figure 4:
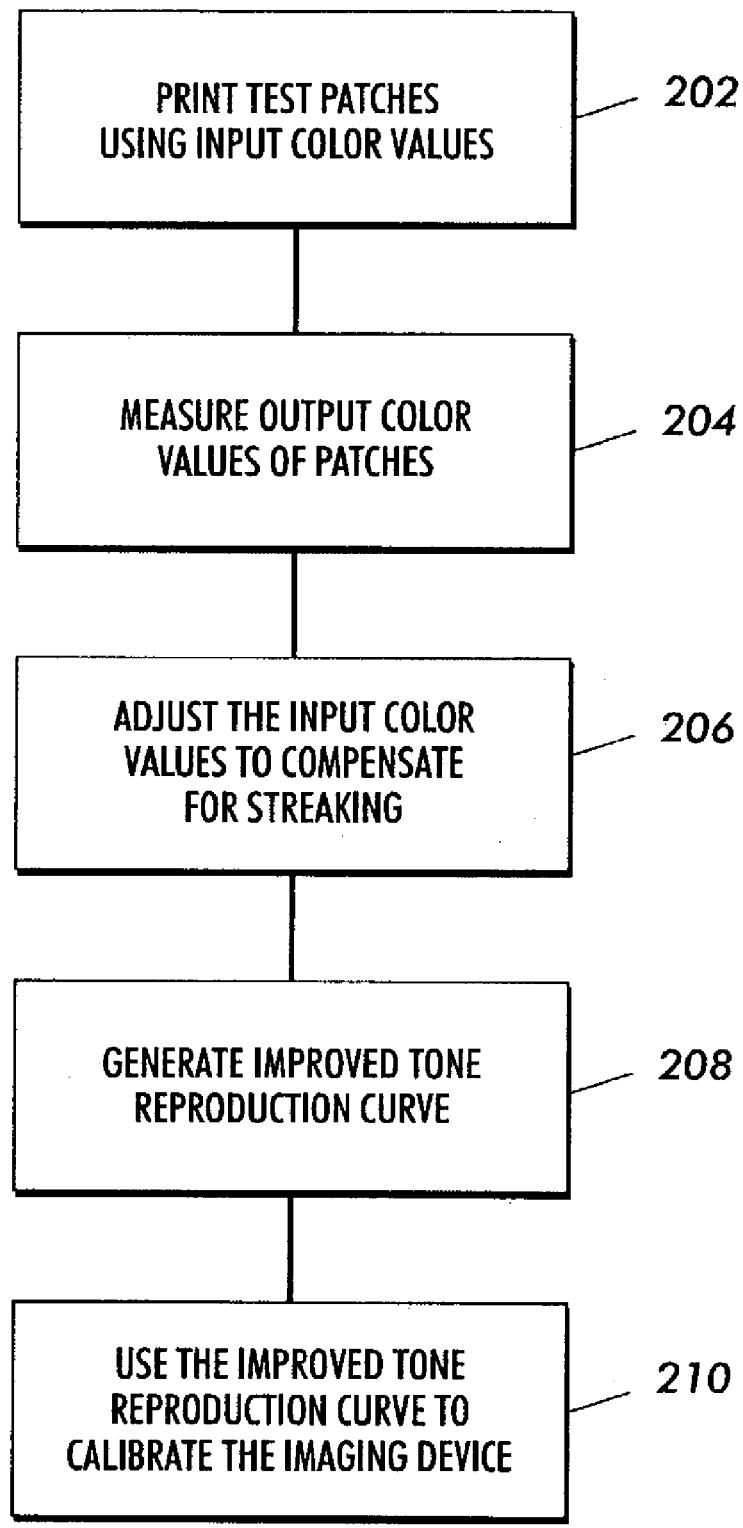
FIG. 4 shows a flow chart of one embodiment of a method in accordance with the subject invention.
Figure 5:
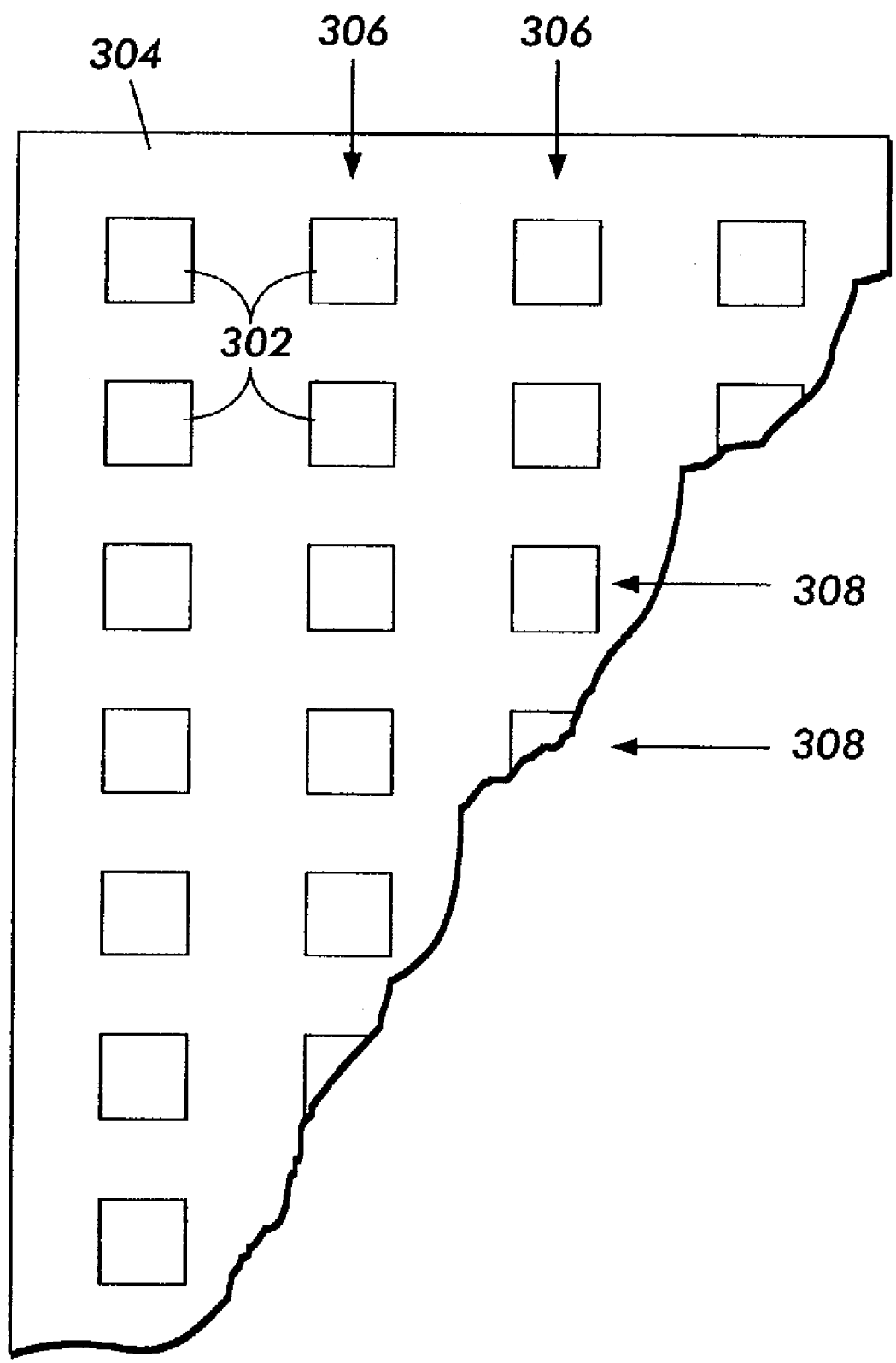
FIG. 5 shows a fragmentary plan view of an array of exemplary patches printed in the method of FIG. 4.

The above-described steps 402 through 410 therefore illustrate in further detail steps 206 and 208 of FIG. 4. Accordingly, referring again more generally to FIG. 4, step 210 is executed next.

In step 210, the improved tone reproduction curve is used to calibrate the imaging device. More particularly, analogous to the polynomial created in step 404, the processor 104 can invert the polynomial of FIG. 9 so as to express the polynomial as an initial input color value as a function of the lightness output color value. This inverted version of the polynomial of FIG. 9 can then be used to calibrate the imaging device. More particularly, the tone reproduction curve can be used by the processor 104 to calculate an input color value that is required in order to achieve a desired lightness value.

The technique described above provides a tone reproduction curve that is compensated for the effects of vertical streaking in the test patch array of FIG. 5. The technique of the subject invention can also be extended to provide a tone reproduction curve that is compensated for the effects of horizontal streaking in the test patch array as well. Compensating for horizontal streaking without compensating for vertical streaking is easily accomplished by performing the techniques of the subject invention on a row by row basis, rather than on a column by column basis as is described above. Such a modification to the column by column technique described herein would be trivial to one skilled in the art, and for that reason is not described in greater detail herein.

It is also possible to apply the subject invention to produce a tone reproduction curve that is compensated for both vertical and horizontal streaking. The procedure for accomplishing such compensation will be described with reference to FIG. 10.

Figure 10:
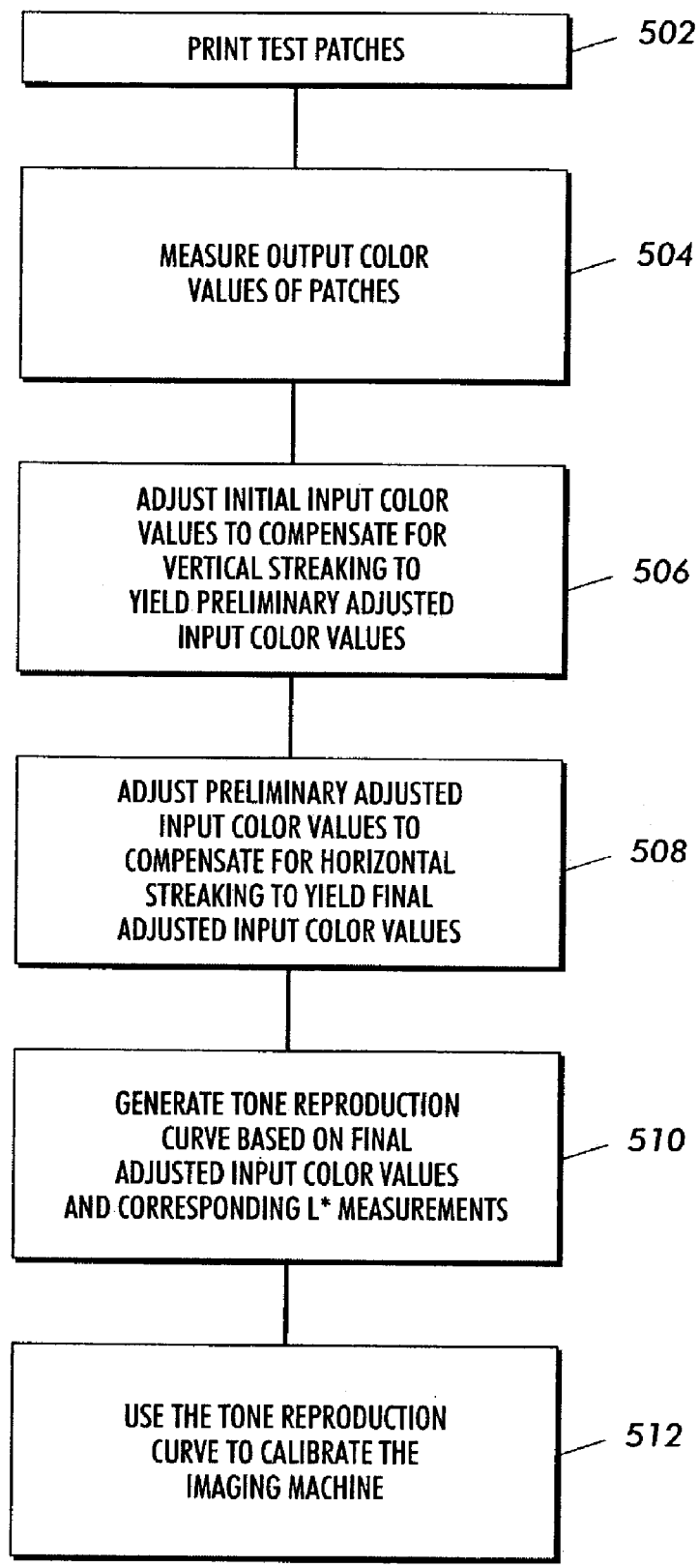
FIG. 10 is a flow chart of one embodiment of a method for producing a tone reproduction curve compensated for both vertical and horizontal streaking in accordance with the subject invention.

Referring now to FIG. 10, in step 502, the imaging arrangement 100 prints an array of orthogonal rows of test patches as described above with reference to step 202 of FIG. 4. As in the previous embodiment, the array of test patches includes both horizontal rows and vertical rows of equivalent-input test patches. After the imaging arrangement 100 prints the test patches on the paper, the color-measuring device 114 measures the output color values of the test patches (step 504) as described above with reference to step 204 of FIG. 4.

In step 506, the processor 104 adjusts the initial input color values in order to compensate for vertical streaking, thereby yielding preliminary adjusted input color values. Step 506 is performed identically to steps 402, 404, 406 and 408 of FIG. 6. At this point, the preliminary adjusted input color values have been compensated for the effects of vertical streaking.

Instead of the processor 104 immediately calculating the tone reproduction curve to be used in calibration, as in step 410 of FIG. 6, the processor 104 instead adjusts the preliminary adjusted input color values to compensate for horizontal streaking (step 508). The process is substantially identical to that used to compensate for vertical streaking, except that (1) the process begins with the preliminary adjusted input color values (already compensated for vertical streaking) instead of with the initial input color values; and (2) the mathematical conversions to be applied to the preliminary adjusted input color values are calculated and applied on a row by row basis rather than on a column by column basis. The row by row application of the mathematical conversions to the preliminary adjusted input color values yields an array of final adjusted input color values. At this point, the final adjusted input color values have been compensated for the effects of both vertical streaking and horizontal streaking.

In step 510, the processor 104 calculates a final tone reproduction curve based on the final adjusted input color values and the corresponding L* measurements of the varied-input test patches. The final tone reproduction curve is unaffected by the presence of either the vertical streaking or the horizontal streaking phenomena. That is, the final tone reproduction curve is compensated for the effects of both vertical and horizontal streaking.

The processor 104 then uses the final version of the tone reproduction curve to calibrate the imaging arrangement (step 512). More particularly, the processor 104 can, if necessary, invert the final tone reproduction curve to be in the form of the input color value expressed as a function of the lightness output color value. Thus, if the image source 112 provides print data that is expressed in CIELAB color space, or is in a form that the processor 104 can translate into CIELAB color space, then the processor 104 can use the final tone reproduction curve to calculate input color values that can be halftoned and sent to the printing device 108 in order to achieve the desired lightness output color value on the print medium.

It should be appreciated that the above-described embodiments are merely illustrative, and that those of ordinary skill in the art may readily devise their own implementations that incorporate the principles of the subject invention and fall within the spirit and scope thereof. For example, the subject invention can be applied both to an electrophotographic copier and to an electrophotographic printer.

Moreover, Table I indicates that the varied-input test patches are surrounded by two loops of equivalent-input test patches produced with input color values of 85 and 170 of a same color, such as black. However, in another embodiment (not shown), two loops of such equivalent-input test patches are provided in the array for each of the four separations (colors) of cyan, magenta, yellow and black. In this embodiment, the array of test patches is much larger than the array indicated by Table I, i.e., the array includes many more test patches.

In addition, there are many variations of mathematical and statistical techniques that can be used to implement the subject invention aside from the specific techniques that are disclosed herein for illustrative purposes. For example, in step 402 (see FIG. 6), a mean measured L* value is calculated after excluding a predetermined percentage of the L* values farthest from a preliminary mean value. However, it is also possible to exclude L* data only if the L* values of equivalent-input test patches in a same column or row are within a predetermined range of each other and both vary from the preliminary mean by a threshold amount, i.e., are outside of a range, indicating the probable presence of streaking throughout the column or row. Also, with reference to FIG. 7, processor 104 can employ techniques other than polynomial fitting, such as spline fitting or neutral networks.

When anomalous or outlying L* values are measured for equivalent-input test patches, it is sometimes indicative of the streaking throughout the column or row. In these cases, it is possible to adjust the input color values of only those varied-input test patches that are in the vertical row or horizontal row of the streaking. That is, the adjusted input color values can be calculated only for the varied-input test patches that are in the same vertical row or horizontal row as the anomalous equivalent-input test patches. The color input values of the remaining varied-input test patches would not be adjusted in order to conserve processing power.

Although anomalous L* measurements are excluded from some calculations in embodiments illustrated herein, it is also possible to not exclude any data in the calculations of the subject invention. In this case, it is not necessary to identify any outliers or anomalous data. Rather, adjustments to input color values of equivalent-input test patches are performed on the basis of the deviation of their corresponding L* measurements from the preliminary mean of the L* measurements of the equivalent-input test patches.

Further, if anomalous data is not to be excluded, it is also possible within the scope of the subject invention to not include any equivalent-input test patches in the array of test patches. Rather, the array can include only varied-input test patches. The preliminary tone reproduction curve would not be calculated based on average L* measurements of equivalent-input patches. Rather, the preliminary tone reproduction curve could be calculated as a best fit of the L* measurements of all of the varied-input patches, or as a best fit of the L* measurements of a sample of the varied-input patches.

As another variation or embodiment, the mathematical conversion used to adjust the input color values could take another form. In steps 406 and 408 (see FIG. 6), the initial input color values corresponding to a given column of test patches are each divided by a common constant or adjustment factor to produce adjusted input color values. However, it is also possible to calculate a more refined mathematical conversion, such as a second or higher order polynomial, that can be applied to the initial input color values of a particular column or row to produce adjusted input color values.

The equivalent-input test patches are shown herein as being disposed along the outside edges of the array of test patches. However, it is also possible for the rows and/or columns of equivalent-input test patches to be positioned within the array, such that the varied-input test patches are disposed on both sides of the rows and/or columns of the equivalent-input test patches. The equivalent-input patches could even be arrayed in numerous other fashions, so long as each row and column is represented, preferably more than once.

The subject invention can be extended farther than has been described herein. One-dimensional polynomials, relating a single color component to measured L* values, have been used in the above descriptions for ease of visualization and illustration. However, it is to be appreciated that the subject invention can also be extended for application to higher dimensional functions, which relate combinations of colorant components, respectively, to measured L*a*b* values.

In particular, it is typical of color printing systems to require complex multidimensional functions to describe the mapping from input separations (CMY or CMYK) to L*a*b*. These functions are inverted by a variety of prior-art techniques to form a mapping from L*a*b* or other convenient color space to CMY or CMYK. The inverted function is commonly imbedded in a three-dimensional lookup table (LUT). The LUT may specify the mapping for all possible input values, but more commonly it only specifies the mapping for a fraction of all possible input values; mappings for the remaining input values are obtained by some form of interpolation. The term "mathematical relationship" as used herein can refer not only to a function, such as polynomial, that relates input values and output values, but also to a lookup table that relates input values and output values. Thus, a lookup table is a type of mathematical relationship as the term is defined herein.

While the simple TRC approach has been described in great detail above, the LUT approach will be described more briefly, as it is a straightforward generalization of the TRC approach. Steps in the LUT approach are as follows for the case of a CMY printer:

1. Obtain an initial mapping from CMY to L*a*b* using prior art techniques, including printing a test page containing a collection of patches.

2. Invert the initial mapping to obtain the reverse mapping from L*a*b* to CMY, using prior art techniques.

3. Apply the inverted mapping obtained in step 2 to all the L*a*b* colors measured from the test page in step 1, yielding a new set of CMY values C'M'Y'.

4. For each patch, find the difference between the C'M'Y' values calculated in step 3 and the initial CMY values specified in step 1, yielding a set of difference values ΔC,ΔM,ΔY.

5. For each column, find the mean error for that column, and use that to adjust the input CMY values from step 1.

6. For each row, find the mean error for that row, and use that to adjust the input CMY values from step 5.

7. Obtain a new mapping from CMY to L*a*b* using the CMY values from step 6, and the measurements of step 1.

8. Invert the mapping as usual to obtain a mapping from L*a*b* to CMY.

As with the one-dimensional case, a specific group of non-varying patches may be used to help identify streaks and exclude them from the initial mapping calculated in steps 1 and 2.

The aforementioned procedure can be extended to the case of more than 3 colorants (e.g. CMYK). However in such cases, one must deal with the fact that the mapping in step 1 is not unique. That is, in the case of a CMYK printer, there are many CMYK combinations that can produce the same L*a*b* value. The result is that the reverse mapping in step 2 has many possible solutions. Suitable constraints must be incorporated in step 2 in order to find a unique CMYK combination for a given input L*a*b* color. One such constraint would be to set the amount of K output by the reverse mapping in step 2 to be the same as the amount of K input to the initial mapping in step 1.

In either the one- or multi-dimensional case, the amount of adjustment may be damped by applying a function that converts small amounts of adjustment to zero while leaving large amounts of adjustment unchanged. One such function is given by $f(x)=x(1-\exp(-ax))$, where a is a parameter, x is the initial adjustment and $f(x)$ is the damped adjustment.

While the invention has been described in terms of regularly formed rows and columns, it is sufficient that the test patches be in known locations expressible in terms of Cartesian (x,y) coordinates: all patches sharing a given x coordinate (i.e. having the same horizontal position) would have the same correction applied to them, while all patches sharing a given y coordinate (having the same vertical position) would have the same correction applied to them.

What is claimed is:

1. A method comprising:
   forming a plurality of test patches in an array of horizontal rows and vertical columns using an imaging machine, each of said test patches being associated with a respective one of a plurality of initial input color values, said test patches including a plurality of varied-input test patches and at least one group of first equivalent-input test patches;
   measuring a respective output color value of each of the test patches;
   generating at least one first mathematical relationship based on the output color values of the at least one group of first equivalent-input test patches;
   calculating a plurality of modeled input color values, each of the modeled input color values being calculated based upon the first mathematical relationship and the measured output color value of a corresponding one of the first equivalent-input test patches;
   calculating a plurality of adjusted input color values for respective ones of the varied-input test patches, each said adjusted input color value being calculated based upon said generated at least one first mathematical relationship, said initial input color value associated with the respective varied-input test patch, said modeled input color value corresponding to one of the first equivalent-input test patches that is in a same said row as the respective varied-input test patch, and the initial input color value associated with the one first equivalent-input test patch that is in a same said row as the respective varied-input test patch;
   computing a second mathematical relationship between the adjusted input color values and the output color values; and
   calibrating the imaging machine by using the second mathematical relationship.

2. The method of claim 1 wherein:
   each of the first equivalent-input test patches is associated with a respective one of first substantially equal initial input color values;
   the array of test patches includes a first row of second equivalent-input test patches, each of the second equivalent-input test patches being associated with a respective one of second substantially equal initial input color values; and
   the first mathematical relationship is computed using:
     the first and second substantially equal initial input color values; and
     the output color values of the first and second equivalent-input test patches.

3. The method of claim 2 wherein each of the modeled input color values is calculated based upon the first mathematical relationship and the measured output color value of a corresponding one of the first and second equivalent-input test patches.

4. The method of claim 1 wherein the calculating of the adjusted input color value includes:
   calculating a third mathematical relationship between:
     said modeled input color value corresponding to the first equivalent-input test patch that is in a same row as the respective varied-input test patch; and
     the initial input color value associated with the first equivalent-input test patch that is in a same row as the respective varied-input test patch; and
   applying the third mathematical relationship to said initial input color value associated with the respective varied-input test patch.

5. The method of claim 1 wherein each said adjusted input color value is calculated based upon said measured output color value corresponding to the first equivalent-input test patch that is in a same row as the respective varied-input test patch.

6. The method of claim 1 further comprising:
   for each of the first equivalent-input test patches, determining whether the output color value of the first equivalent-input test patch is outside of a range; and
   if the output color value of the first equivalent-input test patch is outside of the range, calculating the adjusted input color values for the varied-input test patches that are in a same vertical column or horizontal row as the first equivalent-input test patch.

7. The method of claim 6 wherein the range is calculated based on an average of at least some of the output color values of the first equivalent-input test patches.

8. The method of claim 1 wherein the calibrating of the imaging machine includes using the second mathematical relationship to calculate an initial input color value required to produce a desired output color value.

9. The method of claim 1 wherein said test patches are formed on a print medium.

10. The method of claim 1 wherein each of said test patches is formed of a marking agent, a density of said marking agent varying with said respective adjusted input color value.

11. A method comprising:

forming a plurality of test patches in an array of horizontal rows and vertical columns using an imaging machine, each of said test patches being associated with a respective one of a plurality of initial input color values, said test catches including a plurality of varied-input test patches and at least one group of first equivalent-input test patches, the at least one group of first equivalent-input test patches includes a first horizontal row and a second horizontal row of first equivalent-input test patches;

measuring a respective output color value of each of the test patches;

for each of the first equivalent-input test patches, determining whether the output color value of the first equivalent-input test patch is outside of a range; and if the output color values of two of the first equivalent-input test patches that are in a same said vertical column are both outside of the range, calculating the adjusted input color values for the varied-input test patches that are in the same vertical column as the first equivalent-input test patches.

12. The method of claim 11, wherein the first and second horizontal rows of first equivalent-input test patches are on opposite ends of the array.

* * * * *